US007296734B2

(12) United States Patent
Pliha

(10) Patent No.: US 7,296,734 B2
(45) Date of Patent: Nov. 20, 2007

(54) SYSTEMS AND METHODS FOR SCORING BANK CUSTOMERS DIRECT DEPOSIT ACCOUNT TRANSACTION ACTIVITY TO MATCH FINANCIAL BEHAVIOR TO SPECIFIC ACQUISITION, PERFORMANCE AND RISK EVENTS DEFINED BY THE BANK USING A DECISION TREE AND STOCHASTIC PROCESS

(76) Inventor: Robert Kenneth Pliha, 555 Church St., Apt. 1603, Nashville, TN (US) 37219

( * ) Notice: Subject to any disclaimer, the term of this patent is extended or adjusted under 35 U.S.C. 154(b) by 573 days.

(21) Appl. No.: 10/858,745

(22) Filed: Jun. 2, 2004

(65) Prior Publication Data
US 2005/0273430 A1    Dec. 8, 2005

(51) Int. Cl.
*G06K 5/00* (2006.01)
(52) U.S. Cl. .................... 235/379; 235/382
(58) Field of Classification Search ............ 235/380, 235/379, 382, 382.5, 375; 705/39, 43, 35, 705/40, 38
See application file for complete search history.

(56) References Cited

U.S. PATENT DOCUMENTS

| 3,505,646 | A |   | 4/1970  | Affel, Jr. et al. ........ 340/172.5 |
|-----------|---|---|---------|--------------------------------------|
| 3,716,697 | A |   | 2/1973  | Weir ........................ 235/61.9 |
| 3,941,977 | A | * | 3/1976  | Voss et al. ................. 235/379 |
| 3,959,624 | A |   | 5/1976  | Kaslow .................... 235/61.11 |
| 4,114,027 | A | * | 9/1978  | Slater et al. .................. 705/43 |
| 4,247,759 | A |   | 1/1981  | Yuris et al. ................ 235/381 |
| 4,365,148 | A |   | 12/1982 | Whitney ..................... 235/383 |
| 4,415,065 | A |   | 11/1983 | Sandstedt .................... 186/39 |
| 4,415,802 | A |   | 11/1983 | Long .......................... 235/382 |
| 4,419,573 | A |   | 12/1983 | von Geldern ............... 235/383 |
| 4,554,446 | A |   | 11/1985 | Murphy et al. .............. 235/487 |
| 4,670,853 | A |   | 6/1987  | Stepien ...................... 364/70 S |
| 4,672,377 | A |   | 6/1987  | Murphy et al. ........ 340/825.34 |
| 4,674,041 | A |   | 6/1987  | Lemon et al. .............. 364/401 |
| 4,703,423 | A |   | 10/1987 | Bado et al. ................. 364/400 |

(Continued)

FOREIGN PATENT DOCUMENTS

WO    WO 9723838 A1    7/1997

OTHER PUBLICATIONS

U.S. Appl. No. 09/880,430, filed Jun. 13, 2001, Pliha.

(Continued)

*Primary Examiner*—Thien Minh Le
(74) *Attorney, Agent, or Firm*—Waddey & Patterson; Mark J. Patterson; Emily A. Shouse

(57) ABSTRACT

A financial scoring system for forecasting the financial behavior of a bank customer holding a direct-deposit-account, commonly referred to as a checking account, to forecast the probability of being a cross sell or up sell acquisition candidate, a default candidate on a loan repayment account, a default candidate on a credit card payments, a default candidate on an off-line debit card transaction, an account closing, attrition, candidate, or a potential fraud candidate, such as money laundering. The financial scoring system can assist the bank in determining profitable and non-profitable account activity and customer groups. The financial behavior scoring will help banks to attract retailers to participate and co-sponsor marketing initiative based on the financial score achieved for a specific group of bank customers.

15 Claims, 9 Drawing Sheets

U.S. PATENT DOCUMENTS

| | | | |
|---|---|---|---|
| 4,722,054 A | 1/1988 | Yorozu et al. | 354/401 |
| 4,723,212 A | 2/1988 | Mindrum et al. | 364/401 |
| 4,750,119 A | 6/1988 | Cohen et al. | 364/401 |
| 4,791,281 A | 12/1988 | Johnsen et al. | 235/383 |
| 4,882,675 A | 11/1989 | Nichtberger et al. | 364/401 |
| 4,885,685 A | 12/1989 | Wolfberg et al. | 364/401 |
| 4,908,761 A | 3/1990 | Tai | 364/401 |
| 4,910,672 A | 3/1990 | Off et al. | 364/405 |
| 4,941,090 A | 7/1990 | McCarthy | 364/405 |
| 4,949,256 A | 8/1990 | Humble | 364/401 |
| 5,056,019 A | 10/1991 | Schultz et al. | 364/405 |
| 5,128,752 A | 7/1992 | Von Kohorn | 358/84 |
| 5,305,195 A | 4/1994 | Murphy | 364/401 |
| 5,305,197 A | 4/1994 | Axler et al. | 364/401 |
| 5,353,218 A | 10/1994 | De Lapa et al. | 364/401 |
| RE34,915 E | 4/1995 | Nichtberger et al. | 364/401 |
| 5,502,636 A | 3/1996 | Clarke | 364/401 |
| 5,612,868 A | 3/1997 | Off et al. | 364/214 |
| 5,619,558 A | 4/1997 | Jheeta | 379/90 |
| 5,649,114 A | 7/1997 | Deaton et al. | 705/14 |
| 5,710,886 A | 1/1998 | Christensen et al. | 395/214 |
| 5,734,838 A | 3/1998 | Robinson et al. | 395/214 |
| 6,009,415 A | 12/1999 | Shurling et al. | 705/35 |
| 6,321,208 B1 | 11/2001 | Barnett et al. | 705/14 |
| 6,631,358 B1* | 10/2003 | Ogilvie | 705/39 |
| 2002/0194122 A1* | 12/2002 | Knox et al. | 705/39 |
| 2005/0055296 A1* | 3/2005 | Hattersley et al. | 705/35 |
| 2007/0016500 A1* | 1/2007 | Chatterji et al. | 705/35 |

OTHER PUBLICATIONS

U.S. Appl. No. 09/880,430, filed Jun. 13, 2001, Pliha.

* cited by examiner

SYSTEMS AND METHODS FOR SCORING BANK CUSTOMERS DIRECT DEPOSIT ACCOUNT TRANSACTION ACTIVITY TO MATCH FINANCIAL BEHAVIOR TO SPECIFIC ACQUISITION, PERFORMANCE AND RISK EVENTS DEFINED BY THE BANK USING A DECISION TREE AND STOCHASTIC PROCESS

FIELD OF THE INVENTION

This invention relates to the systems and methods of using a decision tree and stochastic process to score the cash transaction activity of each bank customer holding a direct-deposit-account (DDA) to forecast the financial behavior of each DDA holder to be a most likely and least likely candidates for cross sell, up sell, attrition, default, and fraud events. The DDA scoring process can be extended to forecast the most likely and least likely customers for specific retail incentives, and to forecast profitable and non-profitable account activity.

BACKGROUND OF THE INVENTION

Banks are continuously trying to offer their customers additional products. One of the older techniques is to induce customers with savings account to open a certificate of deposit, or to induce customers retaining a certificate of deposit to participate in an investment fund at a higher interest rate. As an inducement to consider the cross sell offer, banks provide everything from a free toaster, to a fee set of Tupperware. The flaw with this technique is that no consideration is given to the customer's financial ability to maintain the cross sell products being offered.

Over the last decade banks have strength their retail cross sell marketing initiative by implementing demographic and lifestyle segmentation systems to better target and match cross sell products. These segmentation systems, breakdown a bank customer database into lifestyle categories, such as elite suburbs, urban core, country families, to rustic living. Each lifestyle category calculates the median age and income of the category population.

When the segment is selected, various statistical models are applied to information stored in these segment classifications to generate a score that reflects the most likely and less likely to be a candidate for a specific bank or retail product. These statistical model ranges from linear and logistic regression to the new decision tree segmentation modeling techniques, like Chi-Square Automatic Interactive Detector (CHAID). The implementation of these classes of technology have contributed to growth in response rate from less than one-half percent a decade ago, to over two percent in today's bank cross sell world.

A deficiency found with these segmentation techniques, is no economic consideration is given to the amount of cash that flows through a customers direct-deposit, time-deposit, and loan accounts to match a customers financial ability to a specific bank initiative. Bank products are still offered as incentives, which in most cases, the bank customer has no interest or financial ability to support the bank product offered.

In the credit card industry world, an economic scoring technique has been development that determines a credit card holders ability to make credit card payments. The FICO scoring algorithm uses a scoring model and mathematical tables to assign points for different pieces of information which best predict future credit card payment behavior.

The FICO scoring algorithm has taught that by measuring and scoring the variation in payment history of credit card customers, that customer future payment ability can be forecast.

Another invention that has taught the use of scoring to target the right bank customer is described in U.S. Pat. No. 6,009,415 issued to Shurling, et al., where each social security number (SSN) stored in a banks customer-information-file is assigned relationship points based on the number bank accounts tied to each SSN and the period each account has been help by the SSN. The length of time that the SSN has been active is considered in the relationship scoring process. Through the computer implementation of the relationship scoring system, the relationship point are summed for each SSN and match to a bank reward, lower interest rates to no service charges, being offered by the bank management for each level of relationship point accumulation.

The deficiency with this invention is that no consideration is given to measuring and scoring the financial information stored in a bank's CIF. The number of bank account and years of longevity misses addressing the financial ability of the SSN holder.

Bank management is continuously pursuing better method to match customers to the right product to cross sell, and the right incentive to reward. With the establishment of the Sarbanes-Oxley Act, the US Patriot Act, and Basel Accord, the forecasting of account performance, the forecasting of default events, the forecasting of account attrition and detection of account fraud has become a major focus of the bank industry. The systems and method available to date have failed to effectively forecast the financial variations of a direct-deposit-account holder to address these demands.

SUMMARY OF THE INVENTION

The present invention relates to a system and method for predicting the financial behavior of direct-deposit-account holder. The invention measures and score the flow of cash within a customer's demand-deposit, time-deposit, and loan accounts to predict the most likely and less likely candidates for cross sell, up sell, attrition, default and fraud consideration. By adding the cash transaction component to the demographic information for each customer, the invention can match and predict with a high degree of accuracy bank customer financial behavior variations.

The invention can by implemented at any bank including, but not limited, a commercial bank, a savings bank, a savings and loan association, and a credit union, or any financial institution processing a demand-deposit account.

The invention extracts the cash datasets from the direct-deposit-account, and the time-deposit accounts, loans, debit and credit card activity related to DDA holder to build the predictive datasets. Next, the datasets are grouped into multidimensional array that establishes the significance of determining a customer's financial behavior. Each datasets in each multidimensional array is than normalized to produce a standard numeric convention. Based on the specific target variables established by the bank the multidimensional array are processed through a statistical decision tree algorithm to generate a weighted variable and predict segments that represents the based financial behavior match for the target variable established by the bank. The final step in the invention is to increase the accuracy of the prediction by processing the weighted variables through a stochastic process to generate the final probability and score that match each customer's financial behavior as related to the specific target variables establish by the bank.

DETAILED DESCRIPTION OF THE DRAWINGS

Figure 1:
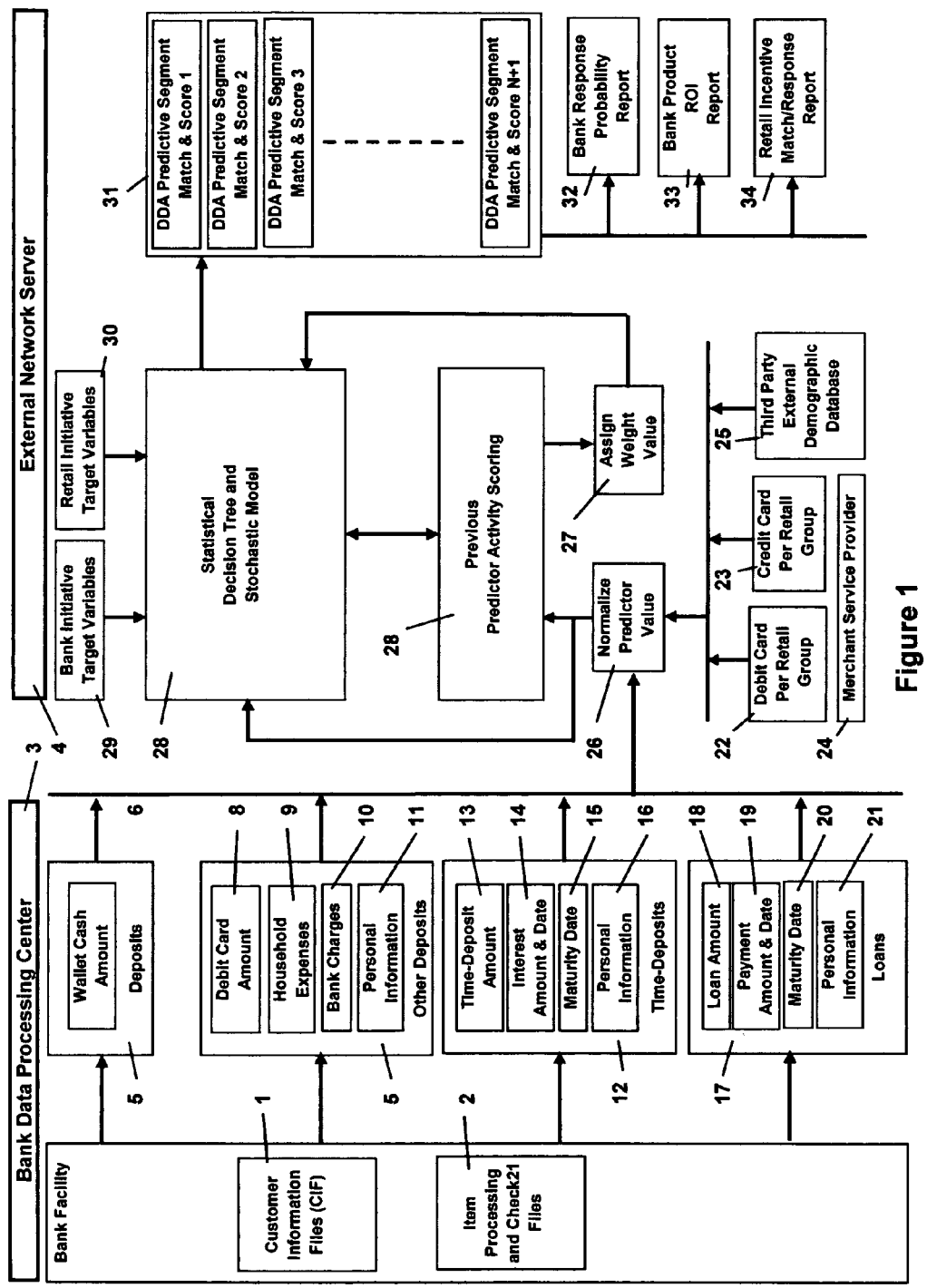
FIG. 1 is a block diagram of the DDA predictive segmentation system of the present invention.

The bank establishes the target variables for each target marketing initiative. Target parameters are classified into two groups: continuous and categorical variables. The continuous variable has numeric values such as 1, 2, 3.14, etc. A categorical variable has values that function as labels rather than numbers. A categorical variable for gender might use the value 1 for male and 2 for female. The actual magnitude of the value of the categorical variable is not significant.

The invention extracts the DDA, Time-Deposit, and Loan account history of each customer holding a DDA from the banks customer-information-file (CIF). The account history is broken down by the beginning and end dates of each processing period. Normal this represents twelve periods. The next step in the invention process is to generate a decision tree for each processing period based on the target variables established by the bank. This multiple decision tree process establishes a financial behavioral pattern that is used to generate future financial behavior patterns for specific target variables.

The dataset value extracted by the invention for each bank processing period is converted to a normalized numeric convention to be used by the invention to process the predictive financial behavior of each customer. The target variables establish by the bank, the normalized cash variables extracted from the bank database, and the demographic variables are than processed by the statistical decision tree model for each processing period. The statistical decision tree model weights the value of each normalized cash variable from previous processing periods to forecast the financial behavior of each bank customer. These previous weighted variables assigned to the normalized cash variable, and demographic variables captured are used to generate the predictive customer segments that best match the target variables. An example of a decision tree model is illustrated.

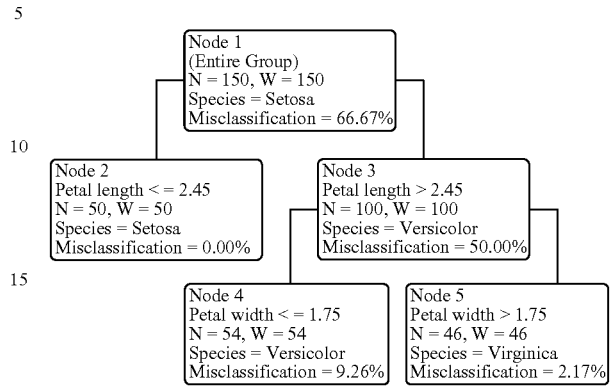

To increase the accuracy of a predictive segments probability the content of the segment is processed repeatedly in a series that combines the output of each weighted function so that the total error of the prediction is minimized. This is classified as a stochastic process.

A stochastic process $X=\{X(t), t \in T\}$ is a collection of random variables. That is, for each t in the index set T, X(t) is a random variable. We often interpret t as time and call X(t) the state of the process at time t. The index set T can be countable set and we have a discrete-time stochastic process, or non-countable continuous set and we have a continuous-time stochastic process. Any realization of X is named a sample path, which can be discrete or continuous. A family is another description of an indexed collection, often used of a family of sets. In contrast to a set of elements, a family can contain an element more than once.

Mathematically, the stochastic process can be described as:

$$\text{Predicted Target} = F0 + B1*T1(X) + B2*T2(X) + \ldots + BM*TM(X)$$

Where F0 is the starting value for the series (the median target value for a regression model), X is a vector of "pseudo-residual" values remaining at this point in the series, T1(X), T2(X) are trees fitted to the pseudo-residuals and B1, B2, etc. are coefficients of the tree node predicted values that are computed by the stochastic algorithm.

Graphically, a stochastic model can be represented like this:

The first tree is fitted to the data. The residuals (error values) from the first tree are then fed into the second tree which attempts to reduce the error. This process is repeated through a chain of successive trees. The final predicted value is formed by adding the weighted contribution of each tree.

A further significant aspect of the invention of the management reports that shows the detail of each predictive segment, and the event probability.

In FIG. 1, the customer information file (1), and item processing/Check 21 files (2) reside in secure bank data processing center (3). The data processing center can be in the bank facility, or at a third party remote data processing center. The external network servers (4) that contain the invention reside on the bank premises. The extraction process is handled at the data processing center by putting the required datasets in either a comma-separated-values format, a meta-transport library, or through a XML query routine preformed by the external network server on the CIF database.

The first step in the extraction sequence is to retrieve the demand deposit account (5) files required to calculate the wallet cash predictor (6). The next step is to extract the demand deposit account (DDA) fields required to calculate remaining cash predictor used by the invention, comprising, debit card amount processed by the DDA (8), household expense processed by the DDA (9), the DDA bank charges (10), and personal information (11) residing in the DDA.

From the time deposit account fields (12) stored in the CIF database, the following fields are extracted, the time deposit amount (13), the interest earned monthly (14), the interest payment date (14), the maturity date of the time deposit (15), and personal information (16) residing in the time deposit account. The final extraction from the CIF database is the loan account fields (17), that include, the loan amount (18), the loan payment amount (19), the loan payment date (19), the loan maturity date (20), the personal information (21) residing in the loan account.

To complete the establishment of the cash predictors, the cash transaction activity occurring through the debit card (22) and credit card (23) held by the DDA holder, is extracted from the merchant service provider (24). The debit card transaction activity is sorting and grouped by merchant name, merchant usage location, total amount of the debit card purchases, and the total number of transaction that generate the total debit card purchases. The debit card purchases and number of transactions become part of the cash predictor array.

The final step in building the predictive information array for the invention is the capturing of the demographic data for each DDA holder. This data become the demographic predictor for the invention. The DDA holder's demographic data is extracted for the CIF database, third party external databases (25), and the merchant name and location from the debit and credit card transactions.

At this point in the invention process, the cash predictors and demographic predictors are converted to standardized normalized predictor values (26). An illustration is converting the age of a DDA holder from a value of 42 to a normalized value of 0.42, or converting the income of a DDA holder from a value of $65,000 to a normalized value of 0.65. Tied to this normalization process handled by the invention, is the generation of the weighted variable (27) that correspond to the normalized predictive value. This process is handled by executing the decision tree and stochastic model (28) for each previous months of captured cash transaction activity. The output of this sequential process generates the weighing variable to be used to forecast the DDA predictive behavior segments based on the bank (29) or retail (30) target variables defined by the bank. Table below illustrate the weighted variable generated by this methodology.

| Invention Predictor Variables Group | Bank Target Variables Weight Variable Range | Retail Target Variables Weight Variable Range |
|---|---|---|
| Wallet Cash | 1.00–0.90 | 1.00–0.90 |
| Time Deposit Interest Amount | 0.89–0.85 | 0.89–0.85 |
| Time Deposit Amount | 0.84–0.80 | 0.64–0.60 |
| Time Deposit Maturity Date | 0.79–0.75 | 0.59–0.55 |

-continued

| Invention Predictor Variables Group | Bank Target Variables Weight Variable Range | Retail Target Variables Weight Variable Range |
|---|---|---|
| Debit Card Amount | 0.74–0.70 | 0.84–0.80 |
| Debit Card POS Usage | 0.69–0.65 | 0.79–0.75 |
| Credit Card Amount | 0.64–0.60 | 0.74–0.70 |
| Credit Card POS Usage | 0.59–0.55 | 0.69–0.65 |
| Demographic Data | 0.54–0.50 | 0.54–0.50 |
| Household Expenses | 0.49–0.45 | 0.49–0.45 |
| Loan Amount | 0.44–0.40 | 0.44–0.40 |
| Fixed Payment Amount | 0.39–0.35 | 0.39–0.35 |
| Loan Maturity Date | 0.34–0.30 | 0.34–0.30 |
| Bank Charges | 0.29–0.25 | 0.29–0.25 |

The target variables for the bank (29) and retail (30) initiatives content the parameters that define the initiative, and the questions to ask the statistical decision tree model (28) to find the predictive segments that match the bank and retail initiative. The target variable parameters can range from identifying customers most likely to deposit and maintenance a balance of $100, $500, $1,000, $5,000, and $10,000 plus or to identifying customer that can support a basket size at a specific retailer of $25, $50, $75, $100, or $150.

The process of determining DDA predictive segments from the target variables, cash predictor variables, and demographic variables is an automatic process executed within the statistical decision tree model. The DDA predictive segments (31) generated by the model describe the informational characteristics of each segment that match the target variables.

The invention content a tabular and graphical report generation system that show the bank management the response probability (32), the bank return-on-investment (ROI) (33), and retailer response probability (34), generated from each segment.

Figure 2:
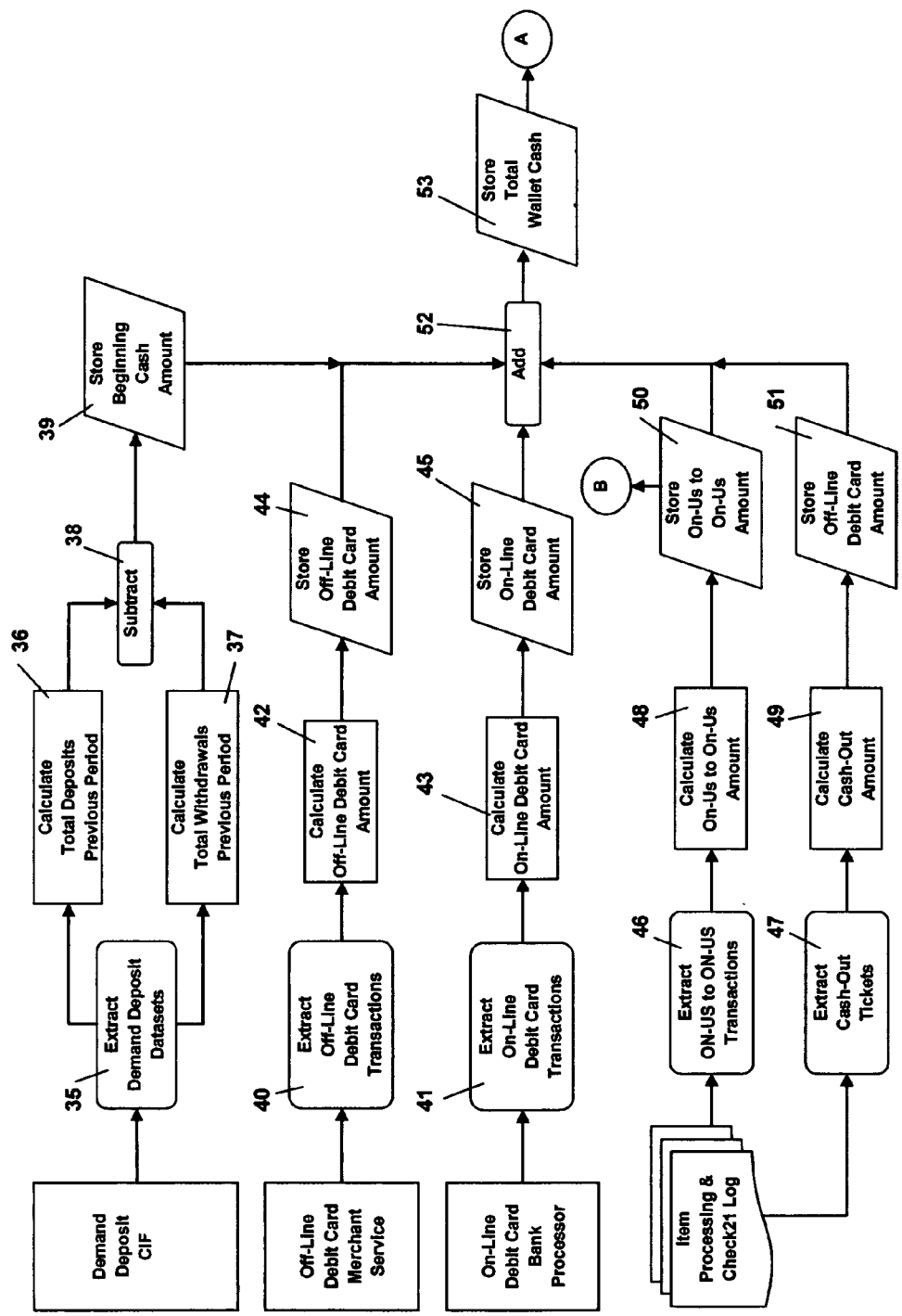
FIG. 2 is the flow diagram detailing the process to extract and calculate the wallet cash customer predictors from a CIF demand-deposit-account.

FIG. 2 is the flow diagram that illustrates the calculation of the wallet cash predictor. From the DDA stored the invention extracts (35) the total deposits (36) and withdrawals (37) from the previous processing period. The total deposits and withdrawals are subtracted (38) to generate the beginning cash (39) from the previous period and temporarily stored. The total amount off-line (40) and on-line (41) debit card transactions are extracted from the bank and merchant processor handling these transaction, the total transaction amount calculated, (42) and (43), and temporarily stored, (44) and (45). The final step of the wallet cash calculation process is to extract the total amount of the on-us to on-us checks (46) and cash-out (47) ticket from the item processing/check 21 files, calculate the total amount, (48) and (49), and temporarily store, (50) and (51). This process identifies on-us checks that put cash in a customers wallet.

After completing these extract the beginning cash amount, the on-line and off-line amount, the on-us to on-us and cash out amount are added (52) together to generate the wallet cash predictor. The wallet cash predictor (53) is temporarily stored.

Figure 3:
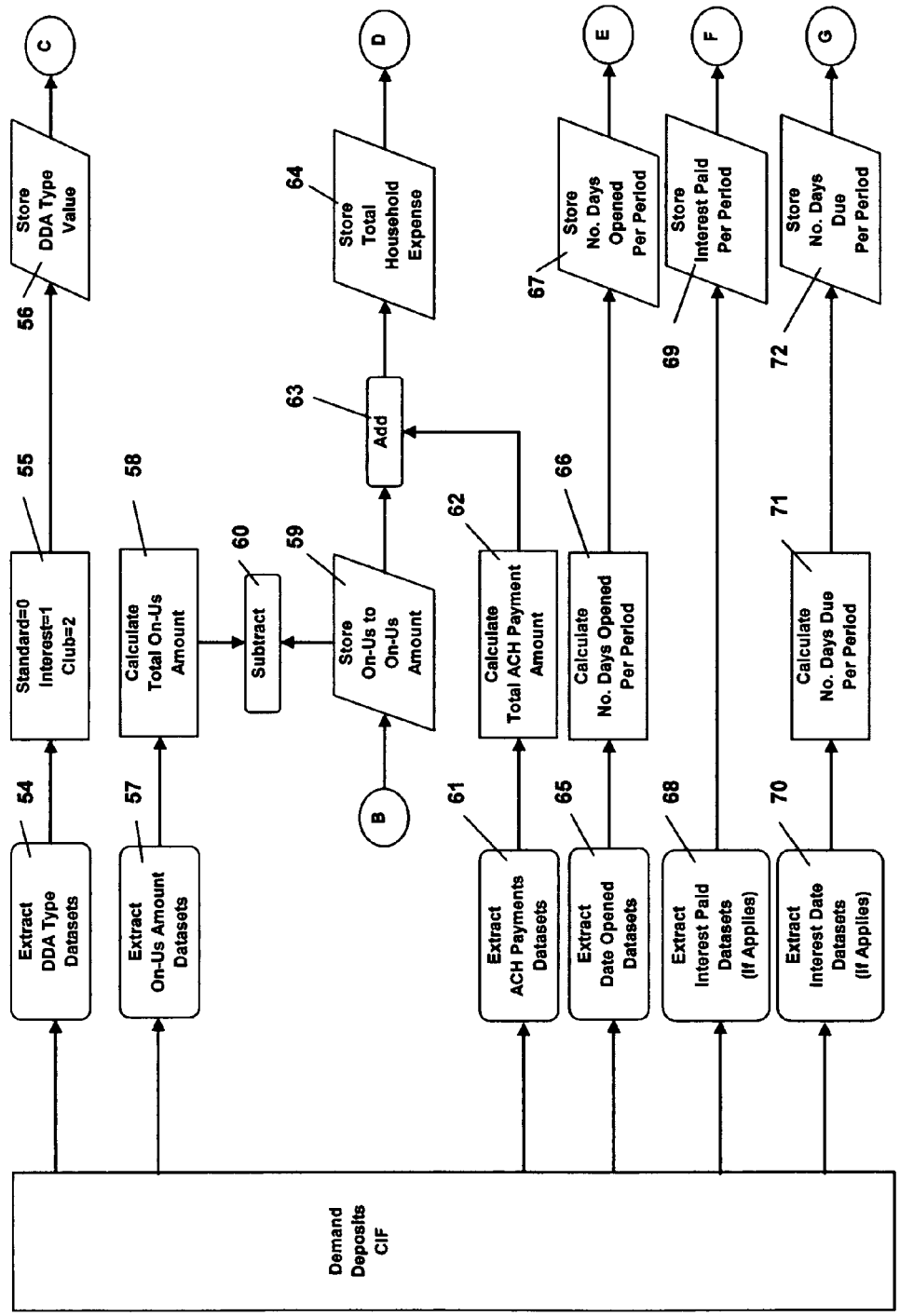
FIG. 3 is the flow diagram detailing the process to extract and calculate the remaining cash customer predictors from a CIF demand-deposit-account.

FIG. 3 completes the DDA extraction process. From the DDA files on each customer, the DDA type (54) is extracted, selected (55) and temporality stored (56): standard DDA=0, interest-bearing DDA=1, and club DDA=2. Next is to calculate the total household expenses are calculated with the following sequence. The on-us amount (56) is extracted, calculated (58) from the DDA files. The previous calculated on-us to on-us amount (59) is subtracted (60) from the on-us amount and temporarily stored. To continue the household expense calculation, the total amount of the ACH payment (61) is extracted, calculated (62) and added (63) to the adjusted on-us amount to generate the DDA household expenses (64) and temporarily stored.

The date that the DDA account was opened (65) is extracted and converted to the number of days opened per period (66) and temporarily stored (67). If the DDA is an interest-bearing account, the interest amount paid (68) is paid is extracted and temporarily stored (69). The date the interest is paid (70) is extracted and converted to the number of days (71) to the next interest payment and temporarily stored (72).

Figure 4:
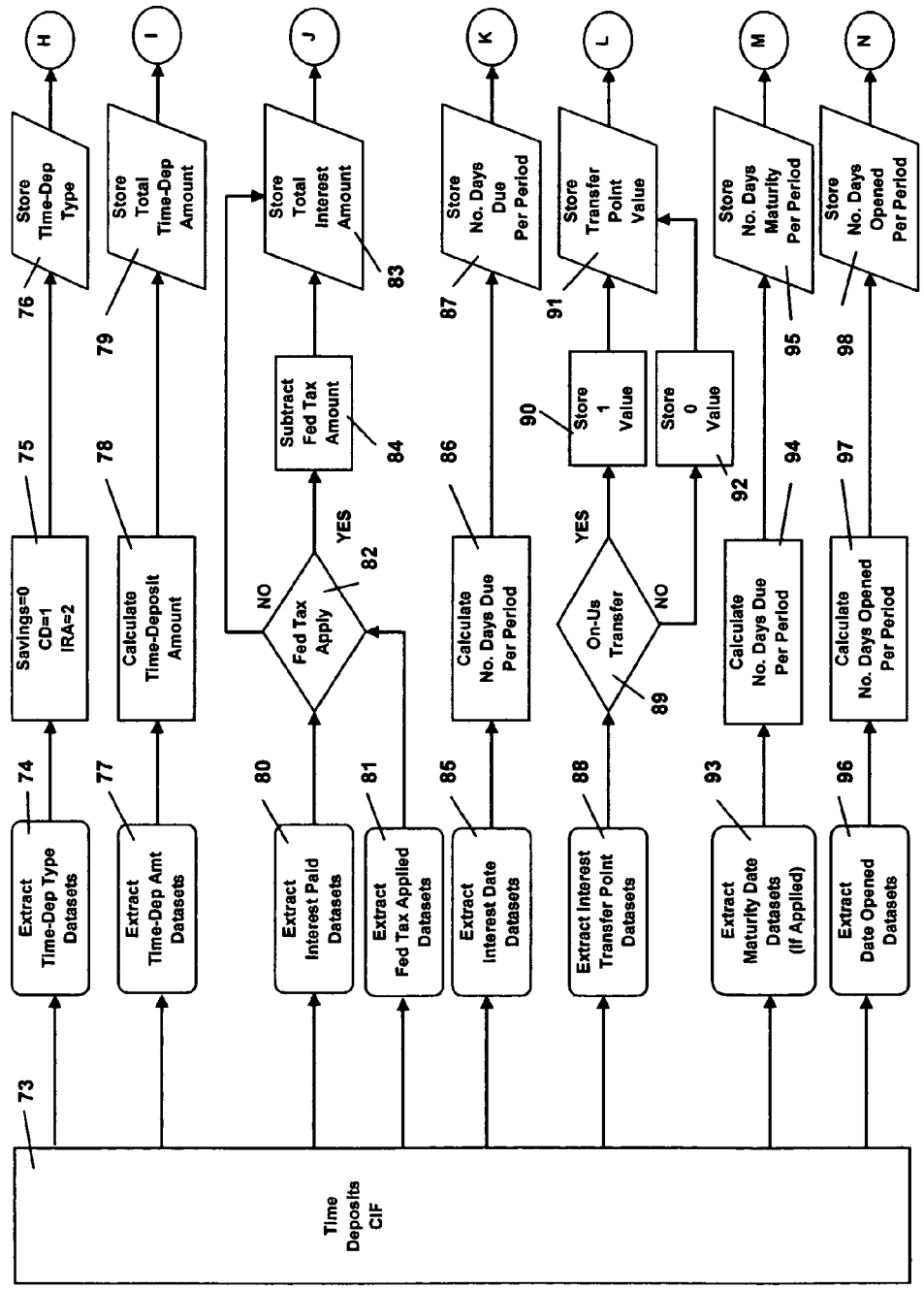
FIG. 4 is the flow diagram detailing the process to extract and calculate the cash customer predictors from a CIF time-deposit account.

FIG. 4 is the flow diagram for extracting the cash predictor from a time-deposit account stored in the CIF database (73). The account type (74) of the time-deposit account is extracted, selected (75) and temporarily stored (76): Savings Account=0, Certificate of Deposit (CD)=1 and Individual Retirement Account (IRA)=2. The time-deposit amount (77) is extracted, calculated (78) and temporarily stored (79). The interest paid (80) amount and federal tax status (81) is extracted. If the federal tax status is a no (82), meaning no taxes are deducted, the interest paid amount is temporarily stored (83). If the federal tax status applies, a yes (82), the tax amount is calculated and subtracted (84) from the interest amount and temporarily stored (83).

The date the interest is paid is extracted (85). The interest date is converted into the number of days to the next payment (86) and temporarily stored (87). The next is to extract (88) and determine the transfer point of the interest payment. If the test is yes (89), which shows that transfer is back to the time-deposit account, rollover, and a one (90), is temporarily stored (91). If the test is no (89), which shows that is to the customer or DDA account a zero (92) is temporarily stored (91).

The maturity date is extracted (93) and converted to the number of days left to maturity (94) and temporarily stored (95). The date the time-deposit is opened (96) is extracted and converted to the number of days opened period (97) and temporarily stored (98).

Figure 5:
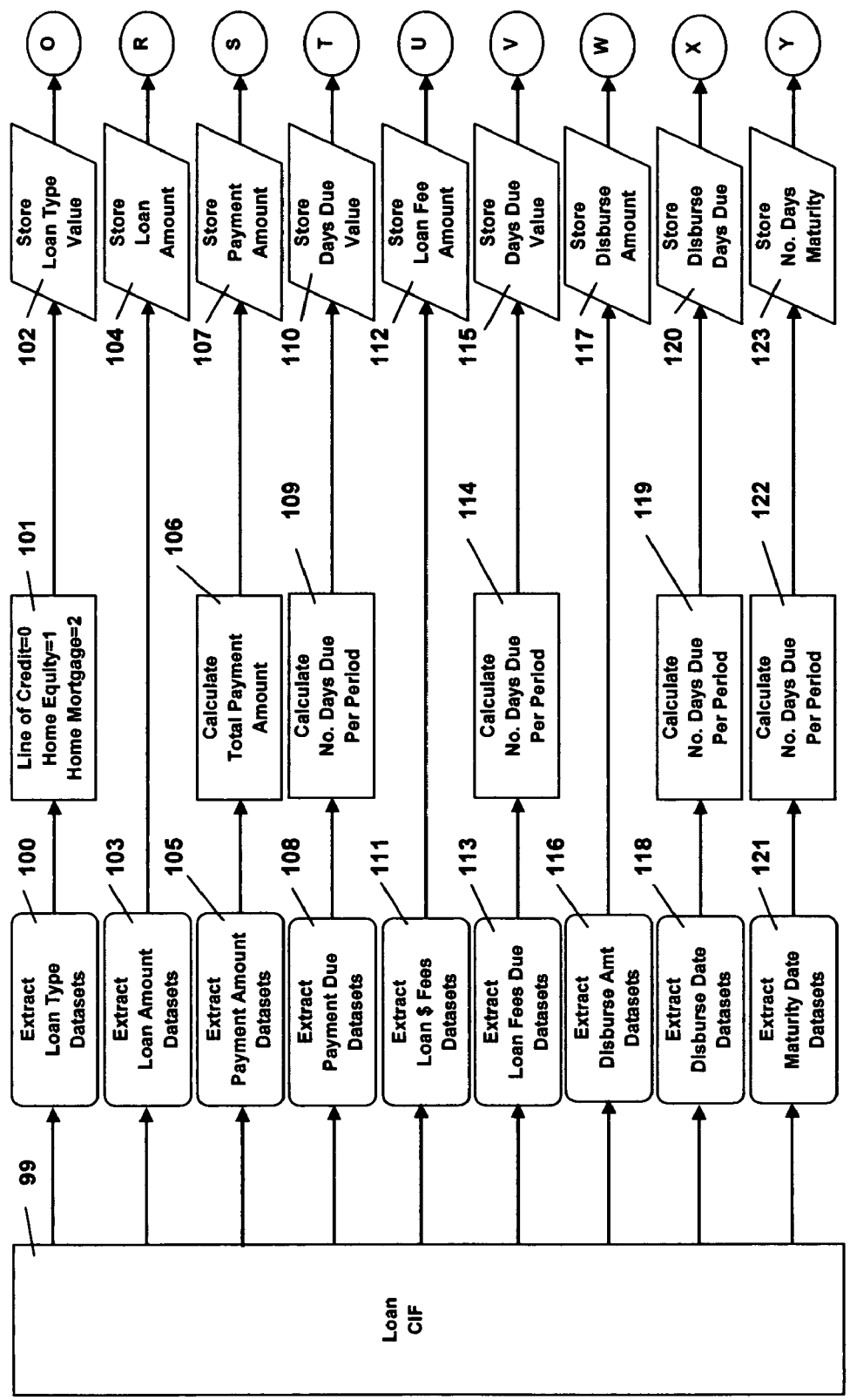
FIG. 5 is the flow diagram detailing the process to extract and calculate the cash customer predictors from a CIF loan account.

FIG. 5 is the flow diagram for extracting the cash predictor from a loan account (99). The type of the loan account is extracted (100), type selected (101) and temporarily stored (102): Line of Credit=0, Home Equity=1 and Home Mortgage=2. The loan amount (103) is extracted and temporarily stored (104). The monthly loan payment amount is extracted (105), calculated (106) and temporarily stored (107). The date the loan payment is due is extracted (108). The loan payment date is converted to the number of days the next payment is due (109) and temporarily stored (110). The annual loan processing fee amount (111) is extracted and temporarily stored (112). The due date of the annual loan processing fee (113) is extracted and converted into the number of days to the due date (114) and temporarily store (115). Extract the disbursements amounts (116) made from a line of credit and home equity loan, and temporary store (117). Extract disbursement due date (118) and converted into the number of days to the due date (119) temporarily store (120). Extract the loan maturity date (121) and converts the maturity date to the number of days remaining to the maturity date each period (122) and temporary store (123).

Figure 6:
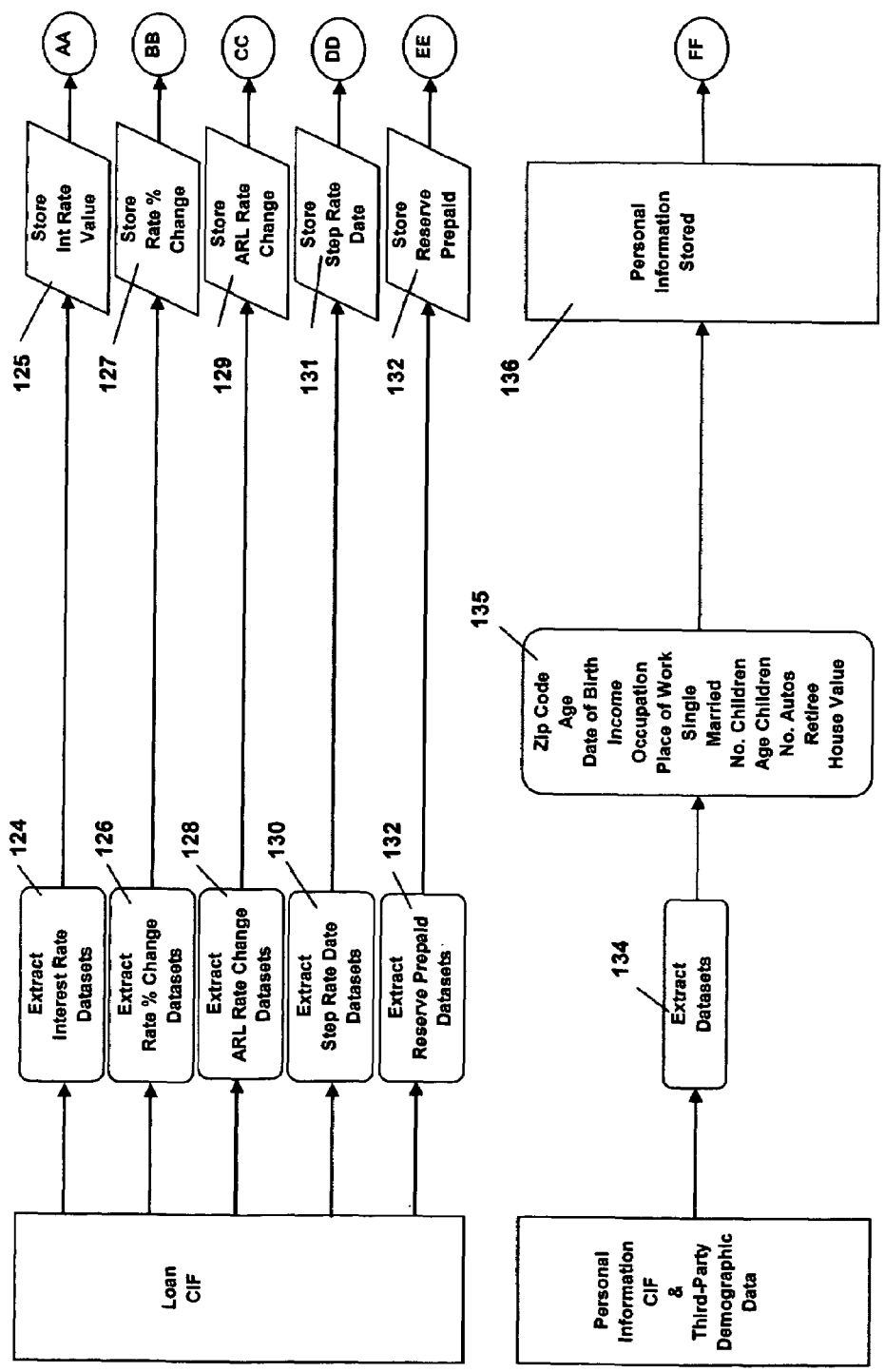
FIG. 6 is the flow diagram detailing the process to extract and calculate the remaining cash customer predictors from a loan account and the personal predictors generated from the CIF and third-party demographic data.

FIG. 6 is the flow diagram for extracting the remaining loan datasets. The interest rate for the loan is extracted (124) and temporary stored (125), the percent the interest rate can change is extracted (126) and temporary stored (127), the Adjustable-Rate-Change (ARL) for and ARL interest rate loan is extracted (128) and temporary stored (129), the date the step is effective is extracted (130) and temporary stored (131), and reserve prepaid amount deposit for the loan account are extracted (132) and temporarily stored (133).

FIG. 6 also shows the personal information extracted (134) from the CIF database or third-party demographic databases to enhance the behavior modeling for selecting the bank customers that match banks or retailers marketing criteria. The personal information extracted (135) and temporarily stored (136): zip code, age, date of birth, income, occupation, place of work, single, married, number of children, age of children, number of automobiles, retiree, and home value.

Figure 7:
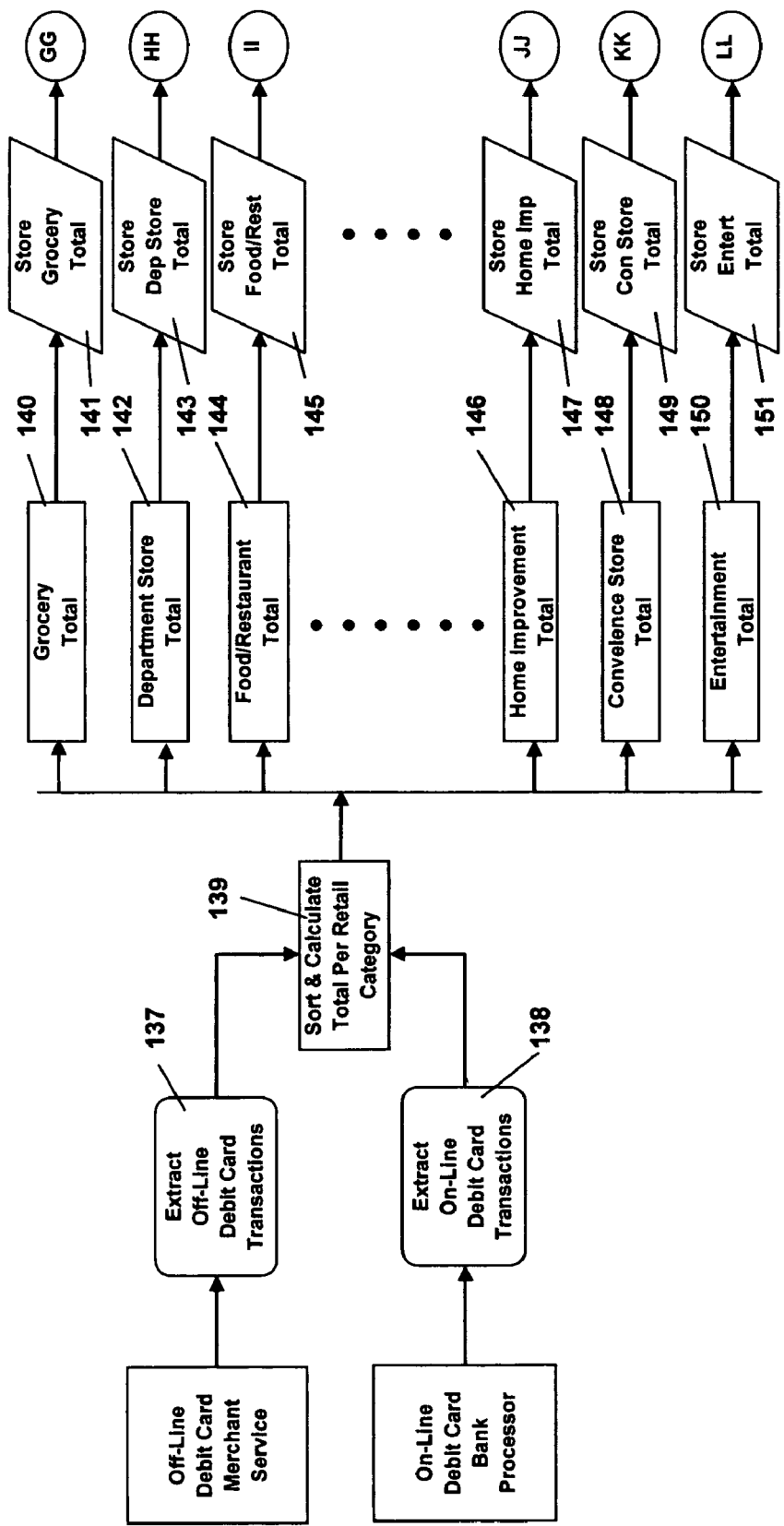
FIG. 7 is the flow diagram detailing the process to extract and calculate the cash customer predictors from the on-line and off-line debit card transaction data.

FIG. 7 is the flow diagram for extracting a DDA holder off-line and on-line debit card transactions. First the off-line debit card transactions are extracted (137) from the merchant service provider and temporarily stored. Next the on-line debit card transactions are extracted (138) from the bank debit card processor and temporarily stored.

The extracted on-line and off-line debit card transactions are sorted and the total transaction activity is calculated (139) per retail category: total grocery transactions (140) and temporary store (141) total department stores transactions (142) and temporary stored (143), total food/restaurant transactions (144) and temporary stored (145), total home improvement transactions (146) and temporary stored (147), total convenience store transactions (148) and temporary stored (149), total entertainment transactions (150) and temporary stored (151), etc.

Figure 8:
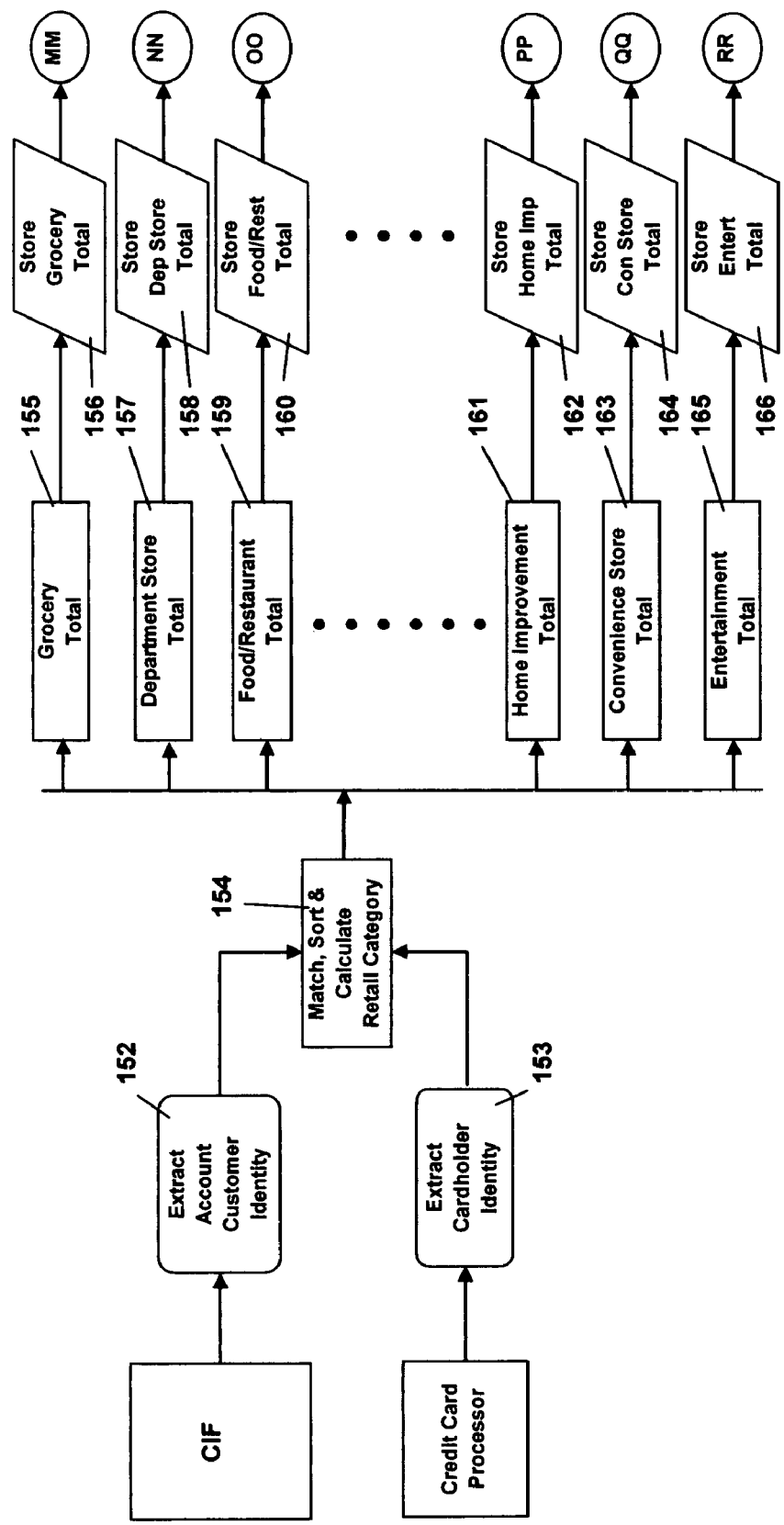
FIG. 8 is the flow diagram detailing the process to match, extract and calculate the cash customer predictors from the credit card transaction data.

FIG. 8 is the flow diagram for extracting a DDA holders credit card transaction. First the DDA holders credit card account identity is extracted (152) from the CIF and temporary stored. Next the credit card transaction is extracted (153) from the credit card processor and temporarily stored.

The credit card transactions are sorted and the total transaction activity is calculated (154) per retail category: total grocery transactions (155) and temporary store (156) total department stores transactions (157) and temporary stored (158), total food/restaurant transactions (159) and temporary stored (160), total home improvement transactions (161) and temporary stored (162), total convenience store transactions (163) and temporary stored (164), total entertainment transactions (165) and temporary stored (166), etc.

Figure 9:
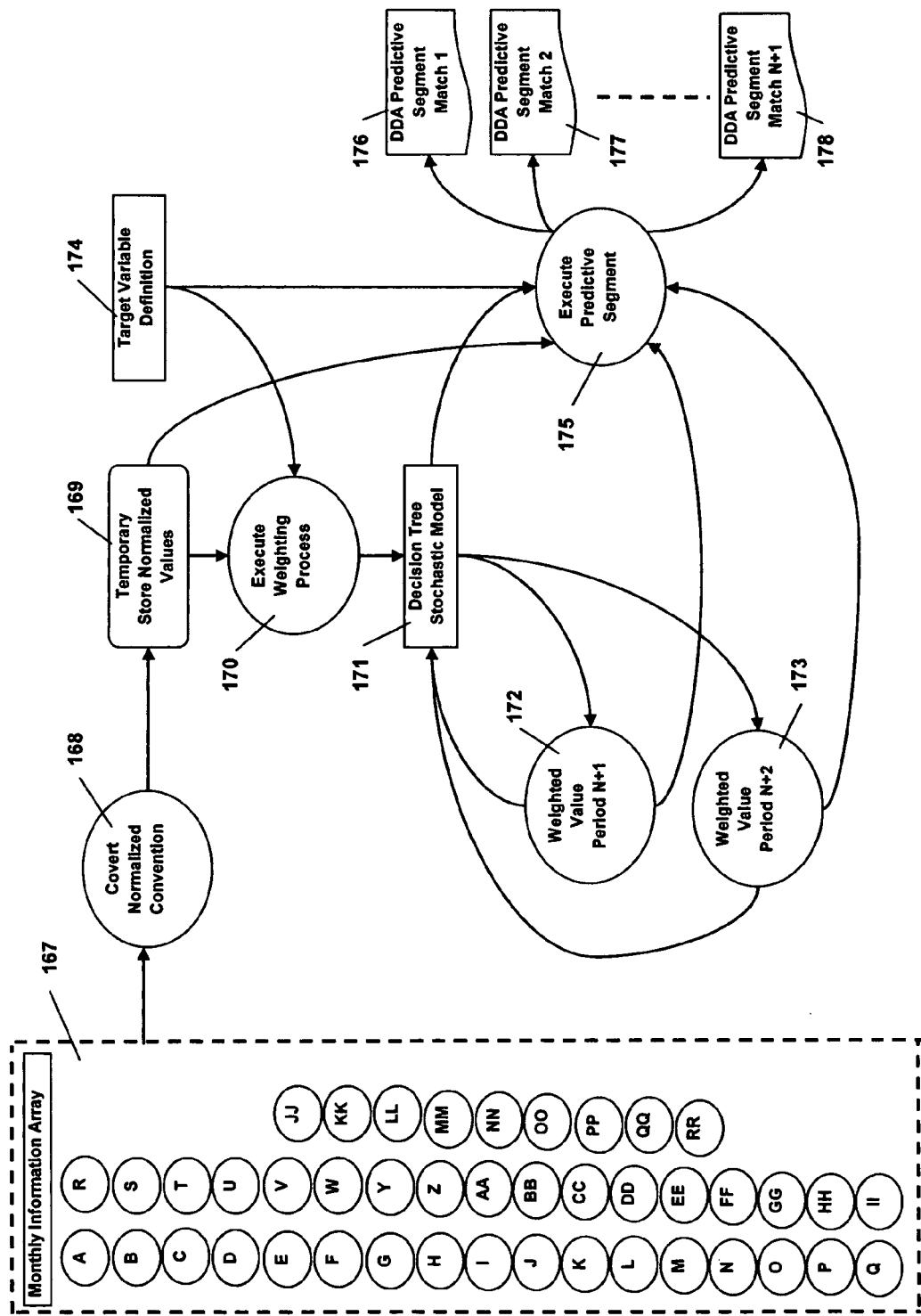
FIG. 9 is the flow diagram detailing the process flow of the cash customer predictors through the statistical decision tree and stochastic model.

FIG. 9 shows the flow diagrams for the main embodiment of the invention. After assembling the cash predictor datasets (167), FIGS. 2–8, the next step in the DDA predictive segment process is to convert the cash predictor variables into standard set of numeric values (168), normalization, to be used by the statistical decision tree and stochastic model to generate the weighted variable. The normalized array is temporary stored (169) per processing period. The weighted variable execution (170) stage is a close-loop decision tree and stochastic process (171), that determines the weighted values (172), (173), for each normalized variable (168) based on the target variable definition (174).

Once the weighted variables are established (172), (173) for each normalized predictor variables, the statistical decision tree and stochastic model executes (175), the DDA predictive segments (176), (177), (178), that match the content of the bank or retail target variables.

I claim:

1. A method of forecasting and scoring the financial behavior of direct-deposit-account (DDA) customer stored in a banks Customer-Information-File (CIF) achieves by measuring the variations in cash transaction activity and spending behavior to predict the financial patterns that match the acquisition, performance, and risk criteria and parameters defined by the bank, comprising:
- the cash transaction occurring in a customer's demand-deposit accounts (DDA);
- the cash transaction occurring in a customer time-deposit accounts;
- the cash transaction occurring in a customer's loan accounts;
- the cash transaction occurring in a customer on-line and off-line debit card accounts;
- the cash transaction occurring in a customer's credit card accounts.

2. The method of claim 1, of calculating the total amount of discretionary cash processed monthly through a customer demand-deposit account (DDA), comprising:
- the beginning and end cash balance each month;
- the total amount of the on-us checks processed each month;
- the total amount of on-us to on-us checks processed each month;
- the total amount of the transit checks processed each month;
- the total amount of the Automated-Clearing-House (ACH) transactions processed each month;
- the total amount of the wire transfers processed each month;
- the total amount of automatic interest transfers processed each month;
- the total amount of online debit card transactions processed each month:
- the total amount of offline debit card transactions processed each month;
- the total amount of automated-teller-machine (ATM) transactions processed each month;
- the total amount of bank charges, including DDA Statement Processing, Non-sufficient funds (NSF), Overdraft (OD), Dormant Account, ATM, FDIC charges, incurred during each months processing.

3. The method of claim 1, of calculating the total amount of household expense cash processed monthly through a customer demand-deposit account (DDA).

4. The method of claim 1, of calculating the total amount cash processed monthly through a time-deposit account held by a DDA customer, comprising:
- the total time-deposit account balance;
- the total amount and date of monthly interest payment;
- the maturity date of the time-deposit account.

5. The method of claim 1, of calculating the total amount cash processed through a loan account held by a DDA customer, comprising:
- the total loan account balance;
- the total monthly loan payment and date;
- the total amount of the monthly loan fees paid;
- the total amount of monthly loan disbursement and date;
- the effective date of an interest rate increase;
- the total amount of the interest rate increase;
- the maturity date of the loan account;
- the total amount of the reserve loan prepaid.

6. The method of claim 1, of calculating the total amount cash processed through the debit card held by a DDA customer, comprising:
- the total dollar amount of the monthly debit card transactions;
- the total number of monthly debit card transactions;
- the average monthly debit card purchase amount;
- the total amount of the monthly debit card transactions at a specific Point-of-Sale location;
- the average monthly debit card purchase amount at a specific Point-of-Sale location.

7. The method of claim 1, of calculating the total amount cash processed through the credit card, single or multiple, held by a DDA customer, comprising:
- the total dollar amount of the monthly credit card transactions;
- the total number of monthly credit card transactions;
- the average monthly credit card purchase amount;
- the total amount of the monthly credit card transaction at a specific Point-of-Sale location;
- the average monthly credit card purchase amount at a specific Point-of-Sale location.

8. The method in claim 1, of capturing the demographic parameters for a DDA customer, comprising:
- the primary resident ZIP CODE of the DDA customer;
- the age of the DDA customer;
- the annual income of the DDA customer;
- the occupation of the DDA customer;
- the single or married status of the DDA customer;
- the size of the family of the DDA customer;
- the age of family members of the DDA customer;
- the number of automobiles held by the DDA customer;
- the retirement status of the DDA customer;
- the house market value owned by the DDA customer.

9. A method of claim 1, of determining and assigning a weighted value to each cash transaction and demographic type stored in the invention database to predicts and scores a DDA customers financial behavior that matches the acquisition, performance, and risk criteria and parameters define by the bank, comprising;
- the weighted variable assigned to the DDA transaction types;
- the weighted variable assigned to the time-deposit-account transaction types;
- the weighted variable assigned to the loan-account transaction types;
- the weighted variable assigned to the debit card transaction types;
- the weighted variable assigned to the credit card transaction types;
- the weighted variable assigned to the demographic parameters.

10. A method of claim 9, of determining and assigning the weighted value based on the target criteria and parameters defined by the bank.

11. A method of claim 9, of determining and assigning the weighted value based on the target criteria and parameters defined by the retailer.

12. The method in claim 1, of using a statistical and decision tree model installed in a computer system configuration, singular or combinational, to weight, and measure the cash and demographic predictor variables extracted from a DDA customers CIF achieve to predict, match, and score the financial behavior based on the criteria and parameters defined by the bank or retailer, comprising;
- the use of a Linear Regression model;
- the use of a Logistic Regression model;
- the use of an Automatic Interaction Detection (AID) model;
- the use of a Chi-Square Automatic Interaction Detection (CHAID) model;
- the use of a Classification and Regression Tree (CART) model;

the use of a Rule Induction model;

the use of a Neural Network model.

13. The method in claim 12, of using a stochastic process defined by the mathematical formula, Predicted Target=F0+B1*T1(X)+B2*T2(X)+ . . . +BM*TM(X), to enhance the predictive financial behavior results of the statistical and decision tree model to predict, match, and score the DDA customers financial behavior based on the criteria and parameters defined by the bank or retailer.

14. The method in claim 13, of using an enhance stochastic formula that is derived from the generation of a DDA customer's financial behavior that matches the criteria and parameters defined by the bank or retailer.

15. The method in claim 12, of printing reports from a computer station that displays the predictive segment financial behavior results, response probability, and return-on-investment forecasting that match the bank or retail predictive criteria.

* * * * *